(12) United States Patent
Chen et al.

(10) Patent No.: US 7,689,982 B1
(45) Date of Patent: Mar. 30, 2010

(54) TRANSPARENT LINKER PROFILER TOOL WITH PROFILE DATABASE

(75) Inventors: Shao-Chun Chen, Aliso Viejo, CA (US); James P. Gustafson, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1360 days.

(21) Appl. No.: 11/124,866

(22) Filed: May 9, 2005

Related U.S. Application Data

(60) Provisional application No. 60/568,927, filed on May 7, 2004.

(51) Int. Cl.
    *G06F 9/44* (2006.01)
(52) U.S. Cl. .................. 717/168; 717/159; 717/162
(58) Field of Classification Search .................. None
    See application file for complete search history.

(56) References Cited

U.S. PATENT DOCUMENTS

| | | | |
|---|---|---|---|
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,878,256 A | 3/1999 | Bealkowski et al. | |
| 5,960,445 A | 9/1999 | Tamori et al. | |
| 6,009,497 A | 12/1999 | Wells et al. | |
| 6,038,636 A | 3/2000 | Brown, III et al. | |
| 6,064,814 A | 5/2000 | Capriles et al. | |
| 6,073,206 A | 6/2000 | Piwonka et al. | |
| 6,073,214 A | 6/2000 | Fawcett | |

(Continued)

FOREIGN PATENT DOCUMENTS

CA    2339923 A    3/2000

(Continued)

OTHER PUBLICATIONS

Luculli, Gabriele. Efficient and Effective Simulation of Memory Maps for System-on-Chip.11[th] IEEE International Conference and Workshop on the Engineereing of Computer Based Systems, May 24-27, 2004, pp. 242-247. Retrieved from the Internet on [Dec. 4, 2009].*

(Continued)

*Primary Examiner*—Tuan Q Dam
*Assistant Examiner*—Cheneca P Smith

(57) ABSTRACT

A linker profiler tool facilitates maintenance and management of object ordering between releases of firmware. By maintaining object ordering, code differences between firmware builds are reduced, which reduces the size of a package of update information used to update an electronic device from one version of firmware to another. Information used by an object code linker in a firmware build activity is processed to minimize changes in code object ordering between builds. The impact on the size of the update information caused by updates to firmware/software component in the build is thereby reduced to a minimum.

18 Claims, 6 Drawing Sheets

U.S. PATENT DOCUMENTS

| | | | |
|---|---|---|---|
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,157,559 | A | 12/2000 | Yoo |
| 6,163,274 | A | 12/2000 | Lindgren |
| 6,198,946 | B1 | 3/2001 | Shin et al. |
| 6,279,153 | B1 | 8/2001 | Bi et al. |
| 6,311,322 | B1 | 10/2001 | Ikeda et al. |
| 6,438,585 | B2 | 8/2002 | Mousseau et al. |
| 7,007,049 | B2 * | 2/2006 | Peng .................. 707/205 |
| 7,086,049 | B2 * | 8/2006 | Goodman ............ 717/168 |
| 2001/0029178 | A1 | 10/2001 | Criss et al. |
| 2001/0047363 | A1 | 11/2001 | Peng |
| 2001/0048728 | A1 | 12/2001 | Peng |
| 2002/0078209 | A1 | 6/2002 | Peng |
| 2002/0099726 | A1 * | 7/2002 | Crudele et al. ........ 707/200 |
| 2002/0116261 | A1 | 8/2002 | Moskowitz et al. |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2004/0168165 | A1 * | 8/2004 | Kokkinen ............ 717/168 |

FOREIGN PATENT DOCUMENTS

| | | |
|---|---|---|
| JP | 8202626 A | 8/1996 |
| KR | 2002-0034228 A1 | 5/2000 |
| KR | 2001-0100328 A1 | 11/2001 |

OTHER PUBLICATIONS

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

US 7,689,982 B1

TRANSPARENT LINKER PROFILER TOOL WITH PROFILE DATABASE

RELATED APPLICATIONS

The present application makes reference to, claims priority to, and claims benefit of U.S. Provisional Patent Application Ser. No. 60/568,927, entitled "TRANSPARENT LINKER PROFILER TOOL WITH PROFILE DATABASE", filed May 7, 2004, the complete subject matter of which is hereby incorporated herein by reference, in its entirety.

The present application makes reference to U.S. patent application Ser. No. 10/646,230, entitled "Mobile Handset Update Package Generator That Employs Nodes Technique", filed Aug. 22, 2003, the complete subject matter of which is hereby incorporated herein by reference, in its entirety.

The present application also makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. When a build of the memory image of firmware and/or software for an electronic device is created in, for example, a manufacturing or product development environment, often the information regarding the firmware and/or software components in the build is lost or discarded. Thus, a subsequent execution of another build cannot make use of information from a previous build. In situations where it is important to discover how a given build is different from a previous build, there is often limited information available, and what is available may be inadequate to determine the changes between builds.

There is a problem in linking firmware and/or software components when the profile of the components in a build is not known prior to the execution of a build. Often, for the computation of difference information between binary images created from two builds, a prediction of instructions is conducted using a predictor tool. The prediction may be based on the heuristic methods. A generator that generates the difference information from the binary images may not know where prediction reference points are. Thus, the verification of the prediction result becomes very difficult. Another problem is that the linker used during the builds controls object linking. Information produced by the linker information is typically not saved for subsequent linking operations. The ordering or sequence information for the various firmware/software components or objects in a build is normally not available. It is not common that a user needs to maintain the object sequence since it does not affect firmware/software functionality. Lack of the object ordering or sequence information is a big problem during the generation of difference information, as it has an impact on efficiency of the generation process and the compactness of the generated update package.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting firmware update using an update agent in a mobile device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to the process of updating software/firmware in electronic devices, and more specifically, to a method of adjusting object code linker behavior during firmware/software development in order to produce more compact update information for the electronic device. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, etc. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., software errors) in the operating code of the electronic device. In a representative embodiment of the present invention, update information may comprise an update package.

Figure 1:
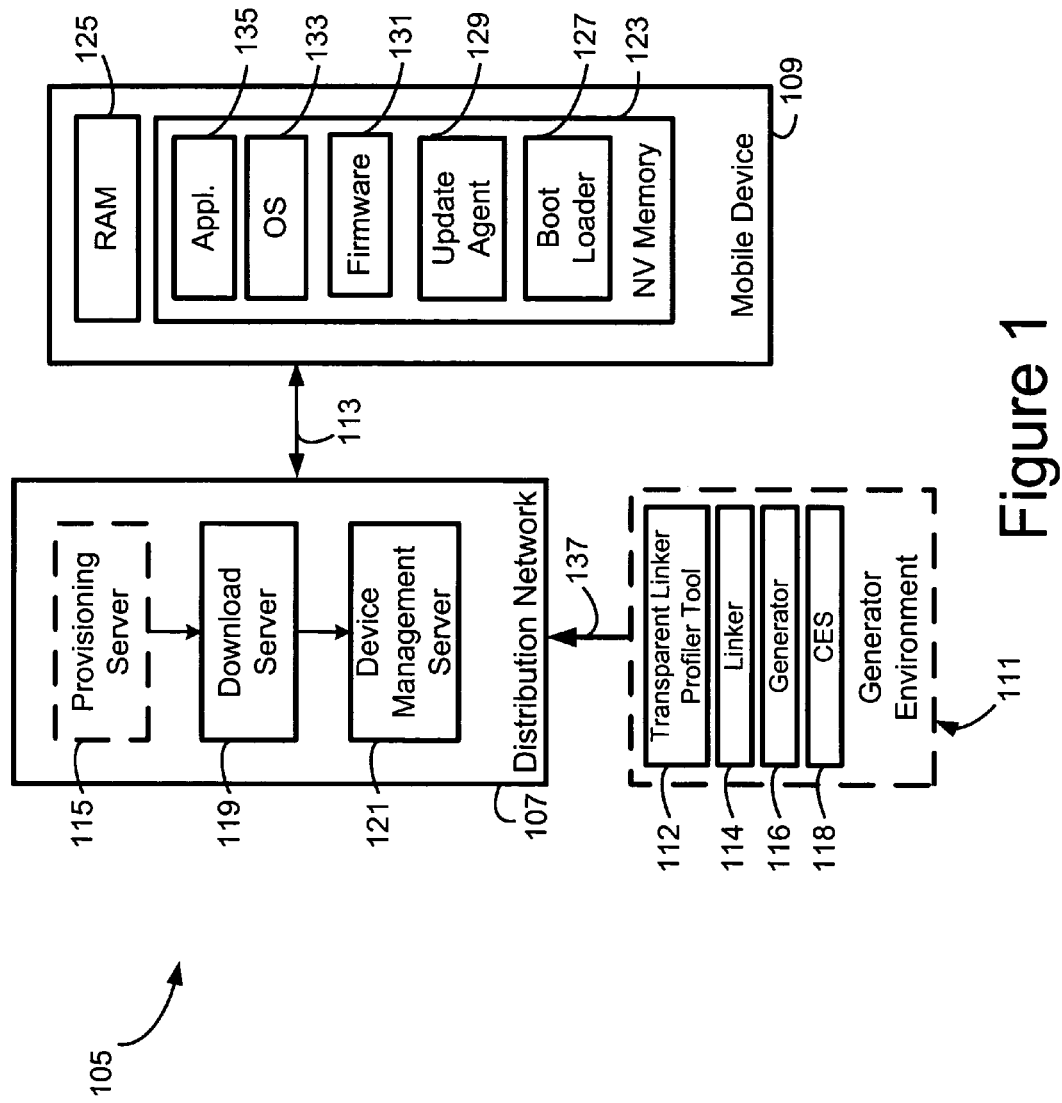
FIG. 1 is a perspective block diagram of a mobile network comprising a mobile device, a distribution network, and a generator environment in accordance with a representative embodiment of the present invention.

FIG. 1 is a perspective block diagram of a mobile network 105 comprising a mobile device 109, a distribution network 107, and a generator environment 111 in accordance with a representative embodiment of the present invention. The mobile device 109 is communicatively coupled to the distribution network 107 by a communication path 113 that may comprise, for example, a wired or wireless network such as a cellular network, an intranet network, an Internet network, a public switched telephone network, to name just a few. The distribution network 107 is communicatively coupled to a generator environment 111 via a communication path 137 that may comprise, for example, a wired or wireless network such as a cellular network, an intranet network, an Internet network, a public switched telephone network, to name just a few. As shown in FIG. 1, the generator environment 111 comprises a transparent linker profiler tool 112, a linker 114, and a generator 116. The transparent linker profiler tool 112 will be discussed in detail, below. The linker 114 functions at least to link object code components from, for example, compilers or assemblers into a binary firmware image. The linker 114 accepts as input in addition to object code component information, parameters and other information that guides the linking process. The linker 114 produces as output, for example, a firmware/software binary image for an electronic device such as the mobile device 109, and information about the location of the firmware/software object code components within the firmware binary image. The generator 116 accepts as input two firmware binary images for two code versions, and produces an update package comprising difference information used in updating an electronic device such as, for example, the mobile device 109. The update packages from the generator 116 are distributed by the distribution network 107 to the mobile device 109. In some representative embodiments of the present invention, the generator environment 111 may be incorporated into the distribution network 107. In a representative embodiment of the present invention, the generator environment 111 may, for example, comprise a server on which is stored software executable by the server, the software causing the server to perform the actions of the transparent linker profiler tool 112, the linker 114, the generator 116, and a code expansion slot (CES) tool 118, as described herein.

As shown in FIG. 1, the mobile device 109 comprises non-volatile memory 123 and a RAM 125. The non-volatile memory 123 comprises a boot loader 127, an update agent 129, a firmware 131, an operating system (OS) 133, and applications 135. In a representative embodiment of the present invention, the update agent 129 may be used to update firmware and/or software resident in the non-volatile (NV) memory 123 or the RAM 125 of the mobile device 109, using an update package as described above. The update agent 129 may be referred to as being 'close-to the-metal', because the update agent 129 may be adapted to interface with the hardware circuitry of the mobile device 109. In a representative embodiment of the present invention, the update agent 129 may be part of the firmware 131 of the mobile device 109, and may be capable of updating the firmware 131 in a fault-tolerant mode, using a bank-by-bank update process. In such an embodiment, the status of the update activity may not be progressively stored, but may be determined using pre-computed cyclic redundancy check values (CRCs) or digital signatures provided in an update package as described above, that may be retrieved from or distributed by the distribution network 107.

In a representative embodiment of the present invention, the update agent 129 may be self-updating. That is, the update agent 129 may be capable of updating its own code to a new version of code. In a representative embodiment of the present invention, the update agent 129 may be capable of using update packages generated by a generator such as, for example, the generator 116 in the generator environment 111 of FIG. 1 to update the firmware and/or software in the mobile device 109.

In a representative embodiment of the present invention, a generator environment such as the generator environment 111 of FIG. 1, may employ what is referred to herein as a "transparent linker profiler tool", represented in FIG. 1 by transparent linker profiler tool 114. A transparent linker profiler tool in accordance with a representative embodiment of the present invention facilitates the collection of profile information generated during a linker phase of a build process, to form a profile database that may be used in subsequent build processes. One example of a transparent linker profiler tool is the Europa transparent linker profiler tool developed by Bitfone Corporation.

As shown in FIG. 1, the generator environment 111 in a representative embodiment of the present invention may comprise a transparent linker profiler tool 112 to create builds of binary images of firmware/software for a mobile device. The generator environment 111 in some representative embodiments of the present invention may also comprise a code expansion slot (CES) tool, shown in FIG. 1 as CES 118, that may facilitate incorporation of empty buffer spaces into a binary memory image or the grouping of components into code expansion slots. In a representative embodiment of the present invention, unused areas of memory that may be referred to as "code expansion slots" (CESs) may be added at the end of code segments or modules, for example. A CES may be added following a code segment or module that is expected to be dynamic or to change frequently over the life of an electronic device such as, for example, the mobile device 109 of FIG. 1. By inserting a CESs following code segments that are expected to undergo change, portions of code following the CESs may be kept stationary in the binary image as changes occur in the previous segment(s) or module (s) by simply shrinking or growing the CESs. In this manner, changes due to the shifting of the code in the code segment(s) or module(s) following the CES may be minimized or eliminated, which results in a lesser amount of difference information and a smaller update package. In a representative embodiment of the present invention, a generator such as the generator 116 may be capable of generating difference information from such binary memory images, and may output the difference information in update packages, described above.

In a representative embodiment of the present invention, a transparent linker profile tool (e.g., the transparent linker profiler tool 112) may act as a wrapper for a conventional object code linker, and may manage parameters and information provided to, and output by, a linker such as, for example, the linker 114 of FIG. 1. For example, in a representative embodiment of the present invention, the transparent linker profiler tool 112 of FIG. 1 may function such that an end user, who normally invokes a linker like linker 114, for example, instead invokes a transparent linker profiler tool such as the transparent linker profiler tool 112, with no observed difference during a build. The linking or build generation process may behave precisely as expected from the perspective of the user, with an additional but essentially invisible benefits of the creation of linker specific information for use in the current build activity, and the saving of updated linker specific information from the current build activity for use in subsequent build activities. In a representative embodiment of the present invention, linker specific information may comprise, for example, a linker map showing the symbolic name, starting address, and length of each code module/segment in the firmware binary image that results from the build activity.

In a representative embodiment of the present invention, preprocessing techniques used in a generation environment such as, for example, the generation environment 111 may be designed to derive, collect, and/or predict the linker specific information. In a representative embodiment of the present invention, information such as the linker specific information described above that is usable by a linker like the linker 114, for example, during a build of a firmware/software binary image may be prepared by a transparent linker profiler tool such as the transparent linker profiler tool 112, before the linker employs the information in a firmware/software build activity. Therefore, the impact due to firmware/software component/module updates associated with a newer image generated by the linker is reduced to a minimum, i.e. the size of an update package capturing the difference information between an old firmware binary image (i.e., a first version of code) and a newer firmware binary image (i.e., a second version of code) is minimized.

In a representative embodiment of the present invention, a transparent linker profiler tool such as the transparent linker profiler tool 112 of FIG. 1 may capture and save linker specific information from a given linking activity during the creation of a firmware/software binary image build, such that it can be used during subsequent linking or build generation activities.

Figure 2:
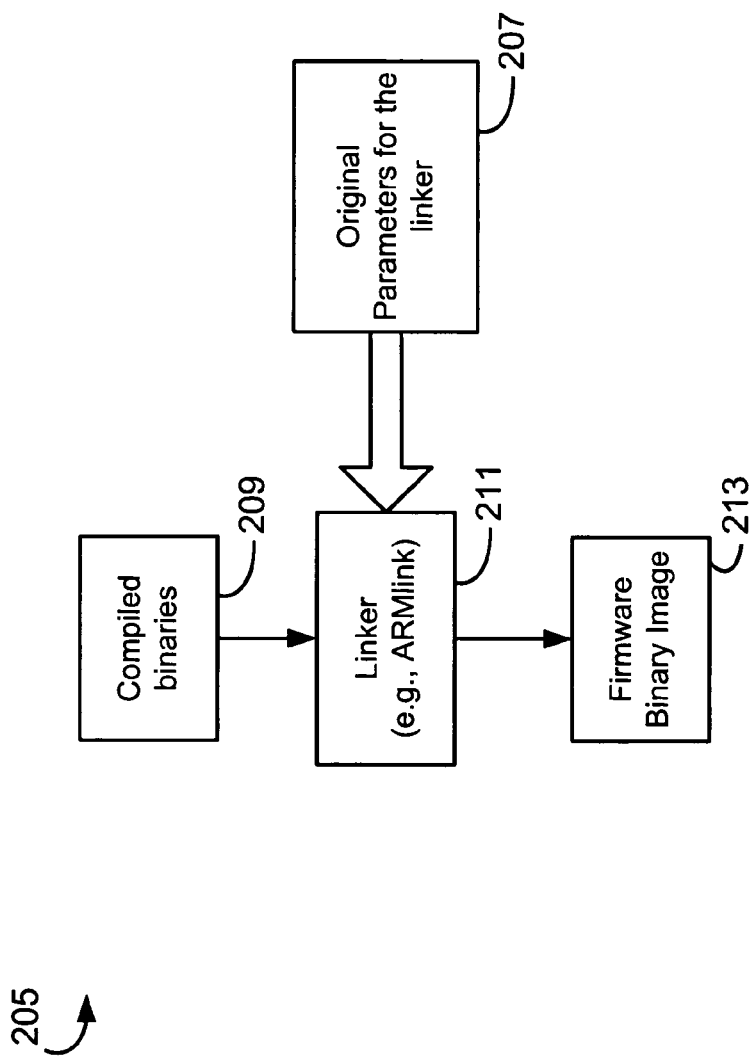
FIG. 2 is a block diagram showing a conventional linking process where a firmware target is created with the help of linker that may, for example, comprise an ARMlink linker from ARM, Ltd.

FIG. 2 is a block diagram showing a conventional linking process 205 where a firmware target 213 is created with the help of linker 211 that may, for example, comprise an ARMlink linker from ARM, Ltd. As shown in the illustration of FIG. 2, the linker 211 consumes compiled/assembled binaries 209 and performs a linking operation according to a set of original parameters 207. The compiled binaries 209 may comprise, for example, object code files to be linked into a firmware binary image 213, that may be subsequently loaded or installed onto an electronic device such as the mobile device 109 of FIG. 1, for example. The original parameters 207 may comprise linker directives that specify how the linker 211 (e.g., an ARMlink linker, when using ARM cased code) is to process the compiled binaries 209 during creation of the firmware binary image 213. The firmware binary image 213 may also be referred to as a "firmware target".

Figure 3:
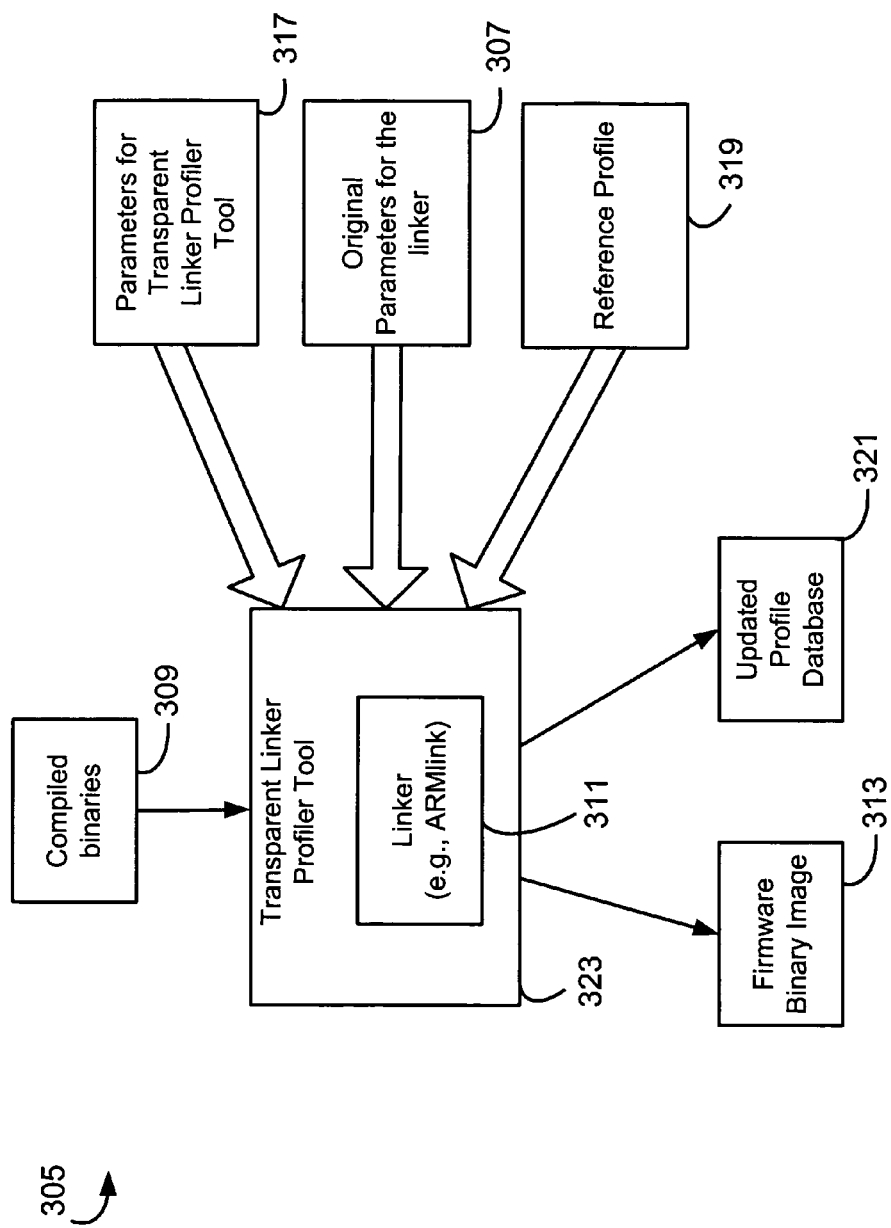
FIG. 3 is a block diagram illustrating data flow during the operation of an exemplary transparent linker profiler tool that may correspond to, for example, the transparent linker profiler tool, in accordance with a representative embodiment of the present invention.

FIG. 3 is a block diagram illustrating data flow during the operation of an exemplary transparent linker profiler tool 323 that may correspond to, for example, the transparent linker profiler tool 112, in accordance with a representative embodiment of the present invention. A transparent linker profiler tool in accordance with a representative embodiment of the present invention may support creation of a firmware binary image 313 for an electronic device such as, for example, the mobile device 109 of FIG. 1, based on a reference profile 319 and parameters. In accordance with one representative embodiment of the present invention, a transparent linker profiler tool such as transparent linker profiler tool 323 of FIG. 3 may "wrap around" the linker 311 in order to manage the behavior of the linker 311 in producing a firmware binary image 313 that results in a more compact and efficient update package for updating an electronic device. In another representative embodiment of the present invention, the transparent linker profiler tool 323 of FIG. 3 may comprise the linker 311.

Parameters may be provided to the transparent linker profiler tool 323 to direct the build process. Such parameters may comprise a set of tool-specific parameters 317 for the transparent linker profiler tool 323, and a set of "original" parameters 307 for the linker 311. The set of original parameters 307 may correspond to, for example, the set of original parameters 207 that may be used by a linker such as the linker 211 of FIG. 2, for example, during a build of a binary image, in which a transparent linker profiler tool in accordance with the present invention. is not employed. A reference profile such as, for example, the reference profile 319 may comprise linker specific information, as described previously, from a previous build. The transparent linker profiler tool 323 may update such a profile that it maintains for the firmware binary image (a.k.a., target) 313 from build to build. Such a profile may be stored in a database, represented in FIG. 3 as updated profile database 321. In a representative embodiment of the present invention, the updated profile database 321 may comprise an update version of the reference profile 319, that has been updated to reflect the results of the build of firmware binary image 313.

In a representative embodiment of the present invention, the transparent linker profiler tool 323 may comprise a binary image optimization tool (not shown) which acts as a front end to the linker 311. The tool-specific parameters 317 parameters for the transparent linker profiler tool 323 may comprise directives that are specific to the tool. Such directives may be used to apply object organization rules (e.g., ordering or sequencing, and memory management), to produce the final firmware binary image 313. The original parameters 307 for the linker 311 may comprise a set of linker directives used for building the firmware binary image 313 according to rules already built into the linker 311. The reference profile 319 may comprise a profile describing the memory map for a target electronic device such as the mobile device 109 of FIG. 1, for example. The reference profile 319 may include directives for both a transparent linker profiler tool like the transparent linker profiler tool 323, and for a linker such as the linker 311, for example. As described previously, the linker 311 may comprise any of a number of commercial object code linkers such as, for example, the ARMlink linker for the ARM family of processors by ARM, Ltd. The compiled binaries 309 of FIG. 3 may comprise object files produced by a compiler or assembler, and the contents of libraries. The compiled binaries 309 may represent deliverables. These libraries and object files may be assembled from multiple sources, including 3*rd* party software that a device manufacturer wants to incorporate. In a representative embodiment of the present invention, the updated profile database 321 may comprise historical information used to build statistical data for predicting an optimal object ordering into the future. The firmware target image 313 comprises the binary image that may be, for example, programmed into non-volatile (NV) memory in an electronic device (e.g., FLASH memory) such as the mobile device 109 of FIG. 1, for example.

In a representative embodiment of the present invention, a user of a transparent linker profiler tool may use it just as the user would use a conventional linker tool such as, for example, the ARMlink tool from ARM, Ltd. For example, in employing a conventional linker such as, for example, the ARMlink linker from ARM, Ltd., the following set of commands may be used:

```
tcc -c -gtp -apcs /interwork -cpu ARM920T -o nanddemoif.o nanddemoif.c
tcc -c -gtp -apcs /interwork -cpu ARM920T -o timer.o timer.c
tcc -c -gtp -apcs /interwork -cpu ARM920T -o main.o main.c
armlink naddemoif.o timer.o main.o -scatter scat.Id -o ua.axf uasdk.a
```

When using a transparent linker profiler tool in accordance with a representative embodiment of the present invention, a user performing a similar build of a firmware binary image may use the following set of commands with, for example, a transparent linker profiler tool named "Europa" such as the transparent linker profiler tool 323 of FIG. 3, for example:

```
tcc -c -gtp -apcs /interwork -cpu ARM920T -o nanddemoif.o nanddemoif.c
tcc -c -gtp -apcs /interwork -cpu ARM920T -o timer.o timer.c
tcc -c -gtp -apcs /interwork -cpu ARM920T -o main.o main.c
europa naddemoif.o timer.o main.o -scatter scat.Id -o ua.axf uasdk.a
```

In a representative embodiment of the present invention, a transparent linker profiler tool may process all the parameters typically provided to a linker. A transparent linker profiler tool such as the transparent linker profiler tool 323 of FIG. 3 may be able to optimize or rearrange the operation of a linker that the transparent linker profiler tool incorporates in order to perform tasks more than just a conventional linking operation.

Figure 4:
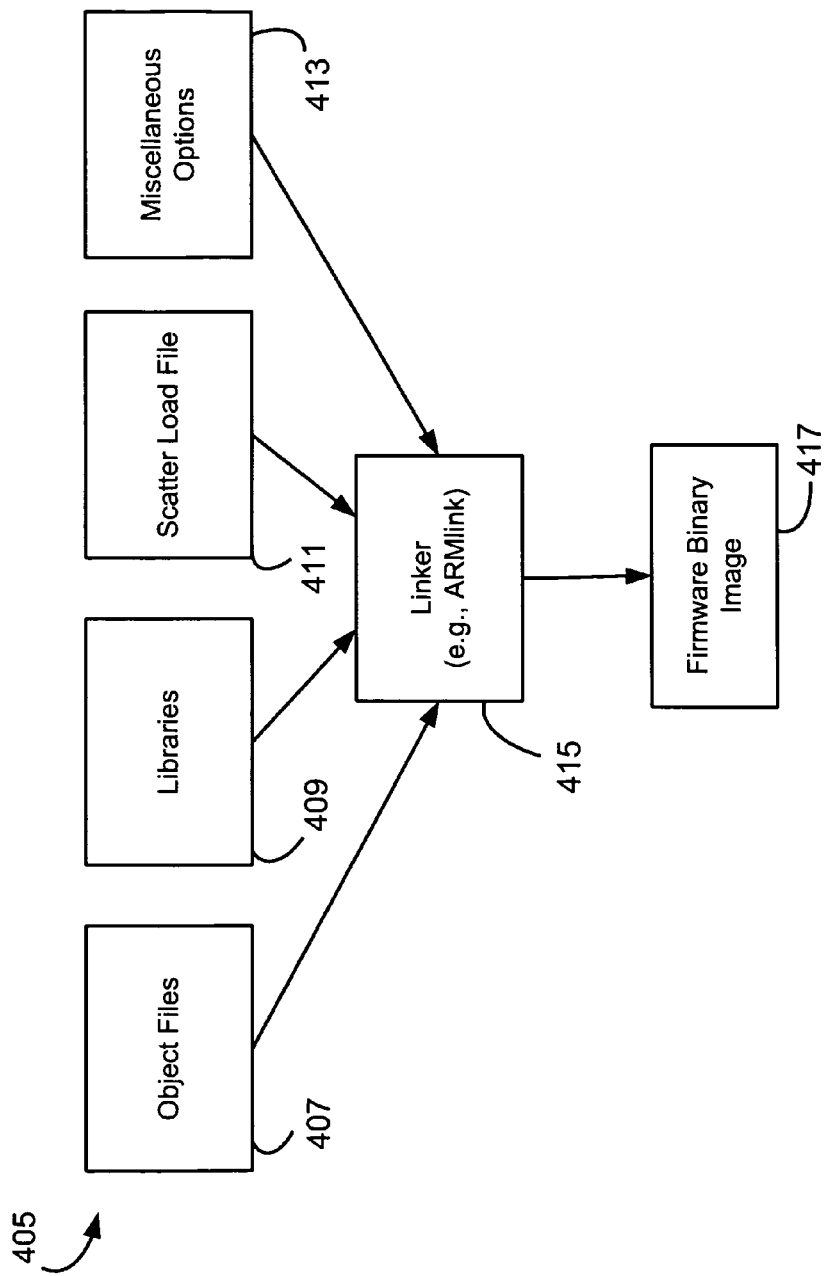
FIG. 4 shows a data flow diagram that illustrated the inputs and the parameters used by a traditional linker that may be employed by a transparent linker profiler tool such as the transparent linker profiler tool of FIG. 3, in accordance with a representative embodiment of the present invention.

FIG. 4 shows a data flow diagram 405 that illustrated the inputs and the parameters used by a traditional linker that may be employed by a transparent linker profiler tool such as the transparent linker profiler tool 323 of FIG. 3, in accordance with a representative embodiment of the present invention. A linker 415 such as, for example, an ARMlink linker from ARM, Ltd. may process object files 407. The object files 407 (e.g., the order in which they are presented to the linker 415, and the order of references to other object files or library files) may provide an implicit order of firmware/software code objects/module within the firmware binary image 417, for example. The linker 415 may process libraries 409, and a scatter load file 411 that may specify the layout of the code objects/module within the firmware binary image that is the output created by the linker 415. The linker 415 may also process miscellaneous options 413 during the build of the firmware binary image 417.

Figure 5:
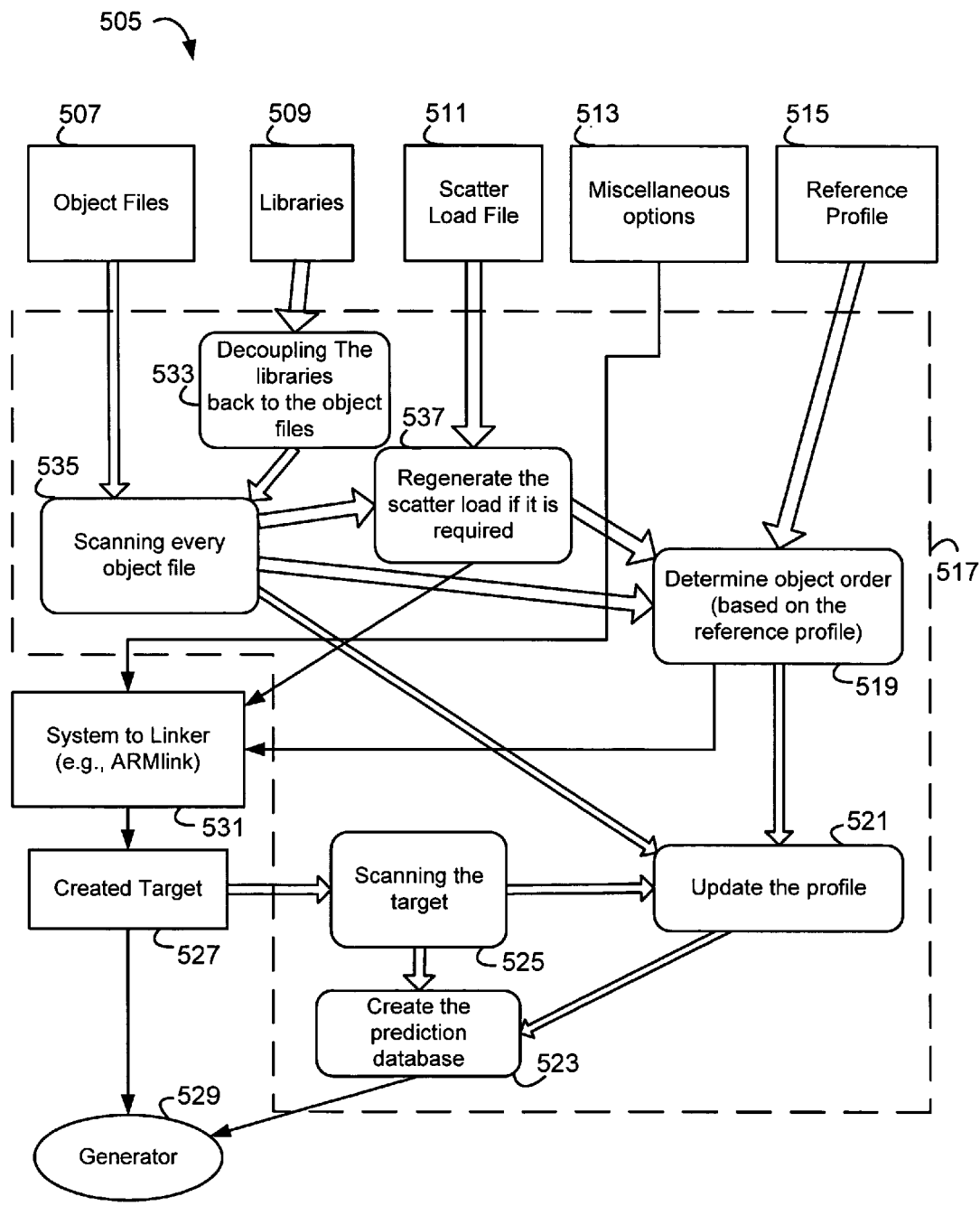
FIG. 5 shows a combined architecture and dataflow diagram that illustrates an exemplary build of a created firmware binary target image using a transparent linker profiler tool that may correspond to, for example, the transparent linker profiler tool of FIG. 3, in accordance with a representative embodiment of the present invention.

FIG. 5 shows a combined architecture and dataflow diagram 505 that illustrates an exemplary build of a created firmware binary target image 527 using a transparent linker profiler tool 517 that may correspond to, for example, the transparent linker profiler tool 323 of FIG. 3, in accordance with a representative embodiment of the present invention. In a representative embodiment of the present invention, a transparent linker profiler tool such as the transparent linker profiler tool 517 of FIG. 5 may support object ordering within the created firmware binary target image 527. The combined architecture and dataflow diagram 505 comprises a transparent linker profiler tool 517 that processes object files 507, libraries 509, a scatter load file 511, a set of miscellaneous options 513, and a reference profile 515. The transparent linker profiler tool 517 may interface with a conventional linker (e.g., linker 415 of FIG. 4) through a system to linker facility 531 that may comprise a means for invoking a conventional linker from the transparent linker profiler tool 517, for example. The combined architecture and dataflow diagram 505 also illustrates the resulting created firmware binary target image 527, and a generator 529 for the creation of difference information used in updating an electronic device such as, for example, the mobile device 109 of FIG. 1.

In a representative embodiment of the present invention, the transparent linker profiler tool 517 may comprise an object file scanning component 535 that may Libraries of object code module or firmware components may be extracted/decoupled from selected libraries from libraries 509 by a decoupling component 533 of the transparent linker profiler tool. Each of the object files 507 and decoupled object code or firmware components from the libraries 509 output by the decoupling component 533 may be scanned by scanning component 535. A reference profile 515 may be processed by an object ordering component 519, that may determine object order in a previous build of the created firmware binary target image 527. Updating of the reference profile 515 may be conducted by a profile updating component 521, that may output an updated profile to a database such as, for example, the updated profile database 321 of FIG. 3, using information from the object file scanning component 535, a target scanning component 525 the object ordering component 519.

In a representative embodiment of the present invention, the scatter load file 511 may be regenerated by a regeneration module 537, to incorporate changes in the object files 507. The transparent linker profiler tool 517 may provide the miscellaneous options 513, the regenerated scatter load file from regeneration module 537, and a rescheduled object order (rather a revised object order) to a system to linker component 531 which passes this information to, for example, a convention linker such as ARMlink from ARM, Ltd., The linker supported by the system to linker component 531 may process the information provided, to created the created firmware binary target image 527, which is subsequently processed by the generator 529 to create an update package containing differencing information, for example.

In a representative embodiment of the present invention, the transparent linker profiler tool 517 may scan every file of the object files 507, while decoupling the library files 509. It may also generate a new scatter loader file like scatter load file 511, for example, that may be based on the previous scatter load file 511, and that may be used to optimize the layout of objects in the new created firmware binary target image 527 that is output by the linker executed via the system to linker component 531. In a representative embodiment of the present invention, the transparent linker profiler tool 517 may automatically incorporate a code expansion slot (CES) into the created firmware binary target image 527, when appropriate. In a representative embodiment of the present invention, the introduction/existence of a CES in the created firmware binary target image 527 may be incorporated into a scatter load file like the scatter load file 511, for example.

In a representative embodiment of the present invention, the contents of the object files 507 may be compiled/assembled to binary form before a linking phase is performed. For example, no binding of object code to physical memory addresses may have been performed. Therefore, target/location specific information may not be present/stored in the object files 507. In a representative embodiment of the present invention, the transparent linker profiler tool 517 may process the object files 507, and the binary code information may be identified by the transparent linker profiler tool 517 for the further/subsequent processing. For example, branch link instructions in the binary code may be identified by the transparent linker profiler tool 517 with 100% accuracy. This may make symbol-based preprocessing unimportant to a prediction component (not shown) of the generator 529 that subsequently processes the created target firmware image 527. As code sections within the object files 507 and/or libraries 509 are properly identified, matching code sections in the created firmware binary target 527 may be found using CRC calculation.

Figure 6:
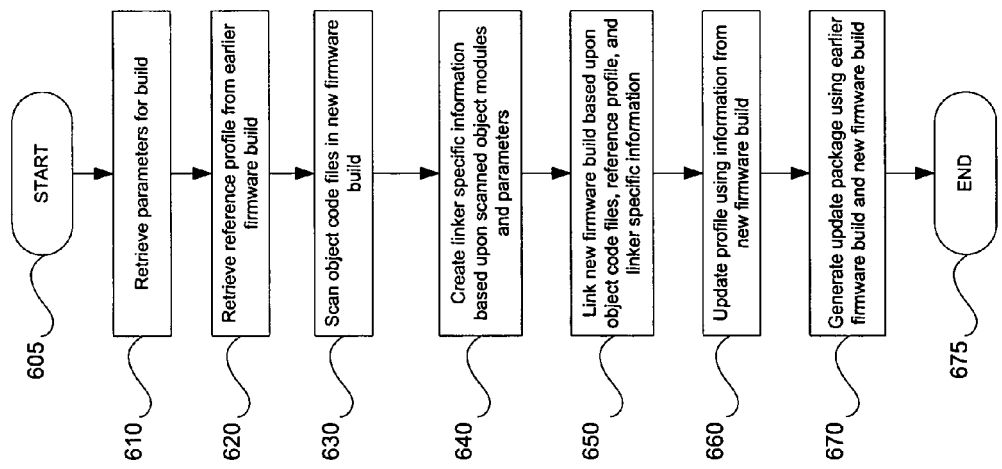
FIG. 6 is a flowchart of an exemplary method of performing a build of firmware for an electronic device such as, for example, the mobile device of FIG. 1, using a transparent linker profiler tool such as, for example, the transparent linker profiler tool of FIG. 5, in accordance with a representative embodiment of the present invention.

FIG. 6 is a flowchart of an exemplary method of performing a build of firmware for an electronic device such as, for example, the mobile device 109 of FIG. 1, using a transparent linker profiler tool such as, for example, the transparent linker profiler tool 517 of FIG. 5, in accordance with a representative embodiment of the present invention. The method of FIG. 6 begins when a user of the transparent linker profiler tools elects to perform a build of a new version of firmware (block 605). The method may first retrieve parameters used by a transparent linker profiler tool such as those described above with respects to FIG. 5 (block 610). This may include parameters for the transparent linker profiler tool, and parameters for a linker employed by the transparent linker profiler tool, for example. Next, a reference profile comprising, for example, memory layout information for a previous build of firmware for the electronic device may be retrieved (block 620). The reference profile may comprise memory layout information from the earlier firmware build. The object code files of the new firmware build may then be scanned for code objects or modules, including those code objects or modules extracted from any libraries that may be used (block 630). In a representative embodiment of the present invention, linker specific information may be created based upon the code objects in scanned object code files and libraries, retrieved parameters, and the reference profile (block 640). In a representative embodiment of the present invention, the transparent linker profiler tool may then employ a conventional linker such as, for example, the ARMLink linker by ARM, Ltd., to perform a link of the object code files, using the linker specific information (block 650). In another representative embodiment of the present invention, the linker used may be contained within the transparent linker profiler tool.

Once the linking of the new firmware is complete, an updated profile may be created using the information resulting from the firmware build, and the update profile may be stored in a database (block 660), for later use in subsequent builds of firmware for the electronic device. Additional details about the contents of the profile are given above with respect to FIG. 5. Next, the earlier firmware version and the newly built firmware version may be used to generate update information, that may be referred to as an update package (block 670). In one representative embodiment of the present invention, the update package may comprise difference information represented as a set of executable instructions for converting the earlier version of firmware to a new or update version of firmware in the electronic device. The generated update package may be stored on a server for distribution to compatible electronic devices via, for example, a wireless or wired network such as a cellular network, an intranet network, an Internet network, and the public switched telephone network, for example. The method then ends (block 675).

A key advantage provided by a transparent linker profiler tool in accordance with a representative embodiment of the present invention is the ability to reduce the impact on the layout of a target firmware image due to arbitrary and/or independent object ordering actions by a linker. In fact, the impact of such actions by a linker is reduced to a minimum. This is accomplished by a transparent linker profiler tool in accordance with a representative embodiment of the present invention, by producing and providing information and linker directives to the linker that will help to arrange the newly created firmware binary image layout such that the variation of the ordering of code objects in a new firmware image with reference to a reference image layout is minimized.

In a representative embodiment of the present invention, the preprocessing conducted by a transparent linker profiler tool to predict linker specific information makes it possible to employ a linker in the management of the memory layout of a firmware binary image, to achieve the desired outcome.

A barrier of conventional target-oriented image updates (e.g., updating a specific component of a target image) is that the prediction may be based on heuristic method. A generator of update information may not know where the prediction points are within the firmware binary image, and the verification of the prediction result becomes very difficult. This problem is solved by employing a transparent linker profiler tool as in a representative embodiment of the present invention. Another problem that affects conventional solutions is that the linker controls the object linking, and hence, object ordering. This situation results from the fact that a user does not normally need to maintain the object sequence in a build of firmware/software, since object order in the build does not affect the firmware functionality. However, the advantages of maintaining the object sequence for the production of compact update information are realized when employing a representative embodiment of the present invention. By maintaining the object order of the created firmware target image close to that of a reference profile, variations in the created image, as measured by the size of the update package generated by a generator like the generator 529, for example, is significantly reduced, by such optimization.

Aspects of the present invention may be seen in a linker profiler tool comprising a reference profile associated with a first version of firmware for an electronic device, the reference profile comprising information representative of ordering of code objects in the first version of firmware, and a plurality of code objects to be incorporated into a second version of firmware for the electronic device. In a representative embodiment of the present invention, the linker profiler tool may use the reference profile to cause ordering of the plurality of code objects in the second version of firmware. The linker profiler tool may facilitate maintaining, in the second version of firmware, the ordering of code objects represented in the reference profile, and the linker profiler tool may build the second version of firmware. The linker profiler tool may reduce variations in the layout of the plurality of code objects between the first version of firmware and the second version of firmware.

In a representative embodiment of the present invention, the linker profiler tool may further comprise a linker tool capable of linking the plurality of code objects into the second version of firmware, a set of original parameters associated with the linker tool, and a set of additional parameters associated with the linker profiler tool. The linker tool may link the plurality of code objects into the second version of firmware based upon the reference profile, the set of original parameters, and the set of additional parameters. The linker profiler tool may comprise the linker tool, and the linker profiler tool may comprise a front-end to the linker tool. In a representative embodiment of the present invention, updated linker information may be collected from the second version of firmware and stored for a subsequent build activity.

Additional aspects of the present invention may be observed in a method of generating an update package for a mobile device comprising a first firmware. The method may employ a plurality of code objects associated with a second firmware for the mobile device. Such a method may comprise retrieving a reference profile associated with the first firmware, and linking the plurality of code objects into a second firmware using the reference profile, such that the order in which the plurality of code objects occur in the second firmware is substantially the same as the order in which the plurality of code objects occur in the first firmware. In a representative embodiment of the present invention, linking may comprise determining an order of the plurality of code objects in the first firmware, using the reference profile, and modifying the plurality of code objects, to conform to the determined order in the first firmware. Linking may also comprise building the second firmware using the plurality of code objects, based on the order of the plurality of code objects in the first firmware, generating difference information using the first firmware and the second firmware, and packaging the difference information and associated metadata into an update package. In a representative embodiment of the present invention, determining may comprise incorporating unused code space following at least one of the plurality of code objects. In a representative embodiment of the present invention, processing may comprise identifying code objects that exist in both the first firmware and the second firmware, and saving information about the identified code objects in the first firmware that are different in the second firmware. Identifying may comprise computing a cyclic redundancy check (CRC) value for each of the plurality of code objects, retrieving a corresponding pre-computed cyclic redundancy check (CRC) value for each of the code objects that are present in the first firmware, and comparing the computed cyclic redundancy check (CRC) value to the corresponding pre-computed cyclic redundancy check (CRC) value. Identifying may also comprise determining whether each of plurality of binary objects has changed based upon the comparison.

Still other aspects of the present invention may be found in machine-readable storage, having stored thereon a computer program having a plurality of code sections executable by a machine for causing the machine to perform the operations described above.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A computer readable medium having encoded thereon instructions for a linker profiler tool which, when executed by a computer, cause the computer to execute the steps of a method of ordering code objects, the computer readable medium comprising:
    a reference profile associated with a first version of firmware for an electronic device, the reference profile comprising information representative of ordering of code objects in the first version of firmware;
    a plurality of code objects to be incorporated into a second version of firmware for the electronic device; and
    wherein the linker profiler tool uses the reference profile to cause ordering of the plurality of code objects in the second version of firmware.

2. The computer readable medium of claim 1 wherein the linker profiler tool facilitates maintaining, in the second version of firmware, the ordering of code objects represented in the reference profile.

3. The computer readable medium of claim 2 wherein the linker profiler tool builds the second version of firmware.

4. The computer readable medium of claim 3 wherein the linker profiler tool reduces variations in the layout of the plurality of code objects between the first version of firmware and the second version of firmware.

5. The computer readable medium of claim 4 further comprising:
    a linker tool capable of linking the plurality of code objects into the second version of firmware;
    a set of original parameters associated with the linker tool;
    a set of additional parameters associated with the linker profiler tool; and
    the linker tool linking the plurality of code objects into the second version of firmware based upon the reference profile, the set of original parameters, and the set of additional parameters.

6. The computer readable medium of claim 5 wherein the linker profiler tool comprises the linker tool.

7. The computer readable medium of claim 5 wherein the linker profiler tool comprises a front-end to the linker tool.

8. The computer readable medium of claim 5 wherein updated linker information is collected from the second version of firmware and stored for a subsequent build activity.

9. A method of generating an update package for a mobile device comprising a first firmware, the method employing a plurality of code objects associated with a second firmware for the mobile device, the method comprising:

retrieving a reference profile associated with the first firmware; and linking the plurality of code objects into a second firmware using the reference profile, such that the order in which the plurality of code objects occur in the second firmware is substantially the same as the order in which the plurality of code objects occur in the first firmware.

10. The method of claim 9 wherein linking comprises:

determining an order of the plurality of code objects in the first firmware, using the reference profile;

modifying the plurality of code objects, to conform to the determined order in the first firmware;

building the second firmware using the plurality of code objects, based on the order of the plurality of code objects in the first firmware;

generating difference information using the first firmware and the second firmware; and packaging the difference information and associated metadata into an update package.

11. The method of claim 10 wherein determining comprises:

incorporating unused code space following at least one of the plurality of code objects.

12. The method of claim 10 wherein processing comprises:

identifying code objects that exist in both the first firmware and the second firmware; and saving information about the identified code objects in the first firmware that are different in the second firmware.

13. The method of claim 12 wherein identifying comprises:

computing a cyclic redundancy check (CRC) value for each of the plurality of code objects;

retrieving a corresponding pre-computed cyclic redundancy check (CRC) value for each of the code objects that are present in the first firmware;

comparing the computed cyclic redundancy check (CRC) value to the corresponding pre-computed cyclic redundancy check (CRC) value; and determining whether each of plurality of binary objects has changed based upon the comparison.

14. A machine-readable storage, having stored thereon a computer program having a plurality of code sections for a method of generating an update package for a mobile device comprising a first firmware, the method employing a plurality of code objects associated with a second firmware for the mobile device, the code sections executable by a machine for causing the machine to perform the operations comprising:

retrieving a reference profile associated with the first firmware; and linking the plurality of code objects into a second firmware using the reference profile, such that the order in which the plurality of code objects occur in the second firmware is substantially the same as the order in which the plurality of code objects occur in the first firmware.

15. The machine-readable storage of claim 14 wherein linking comprises:

determining an order of the plurality of code objects in the first firmware, using the reference profile;

modifying the plurality of code objects, to conform to the determined order in the first firmware;

building the second firmware using the plurality of code objects, based on the order of the plurality of code objects in the first firmware;

generating difference information using the first firmware and the second firmware; and packaging the difference information and associated metadata into an update package.

16. The machine-readable storage claim 15 wherein determining comprises:

incorporating unused code space following at least one of the plurality of code objects.

17. The machine-readable storage of claim 15 wherein processing comprises:

identifying code objects that exist in both the first firmware and the second firmware; and saving information about the identified code objects in the first firmware that are different in the second firmware.

18. The machine-readable storage of claim 17 wherein identifying comprises:

computing a cyclic redundancy check (CRC) value for each of the plurality of code objects;

retrieving a corresponding pre-computed cyclic redundancy check (CRC) value for each of the code objects that are present in the first firmware;

comparing the computed cyclic redundancy check (CRC) value to the corresponding pre-computed cyclic redundancy check (CRC) value; and determining whether each of plurality of binary objects has changed based upon the comparison.

* * * * *

UNITED STATES PATENT AND TRADEMARK OFFICE
CERTIFICATE OF CORRECTION

PATENT NO. : 7,689,982 B1 Page 1 of 1
APPLICATION NO. : 11/124866
DATED : March 30, 2010
INVENTOR(S) : Shao-Chun Chen et al.

It is certified that error appears in the above-identified patent and that said Letters Patent is hereby corrected as shown below:

In column 14, line 23, in Claim 16, after "storage" insert -- of --.

Signed and Sealed this

Fifteenth Day of June, 2010

David J. Kappos
*Director of the United States Patent and Trademark Office*